United States Patent [19]
Bates et al.

[11] Patent Number: 6,052,345
[45] Date of Patent: Apr. 18, 2000

[54] SYSTEM FOR COMPENSATING FOR HARD SECTOR NOISE DEGRADATION OF TRACKING ERROR SIGNALS IN AN OPTICAL DATA STORAGE SYSTEM

[75] Inventors: Allen Keith Bates; Nhan Xuan Bui; Alan August Fennema, all of Tucson, Ariz.; Tetsuo Semba, Zama, Japan

[73] Assignee: International Business Machines Corporation, Armonk, N.Y.

[21] Appl. No.: 09/261,927

[22] Filed: Mar. 3, 1999

Related U.S. Application Data

[62] Division of application No. 08/803,549, Feb. 20, 1997, Pat. No. 5,936,919.

[51] Int. Cl.[7] .................................................. G11B 7/09
[52] U.S. Cl. ............................................................ 369/44.34
[58] Field of Search ............................. 369/44.34, 44.32, 369/44.25, 44.29, 44.35, 44.36, 54, 58, 44.13

[56] References Cited

U.S. PATENT DOCUMENTS

| | | | |
|---|---|---|---|
| 4,839,876 | 6/1989 | Fennema | 369/32 |
| 4,847,822 | 7/1989 | Takasugi et al. | 369/44.13 |
| 4,899,327 | 2/1990 | Bates et al. | 369/45 |
| 4,914,725 | 4/1990 | Belser et al. | 318/560 |
| 4,974,219 | 11/1990 | Korth | 369/13 |
| 5,097,361 | 3/1992 | Childers et al. | 359/824 |
| 5,108,184 | 4/1992 | Brown et al. | 356/363 |
| 5,134,601 | 7/1992 | Greenwell et al. | 369/44.26 |
| 5,138,594 | 8/1992 | Fennema et al. | 369/44.29 |
| 5,142,516 | 8/1992 | Fennema | 369/44.28 |
| 5,199,017 | 3/1993 | Kagami et al. | 369/44.28 |
| 5,220,546 | 6/1993 | Fennema | 369/32 |
| 5,235,574 | 8/1993 | Aviles et al. | 369/32 |
| 5,247,498 | 9/1993 | Takekoshi et al. | 369/32 |
| 5,249,168 | 9/1993 | Kagami et al. | 369/44.27 |
| 5,253,245 | 10/1993 | Rabedeau | 369/119 |
| 5,268,887 | 12/1993 | Honguh et al. | 369/44.26 |
| 5,317,550 | 5/1994 | Semba | 369/32 |
| 5,323,368 | 6/1994 | Semba | 369/32 |
| 5,343,454 | 8/1994 | Watanabe et al. | 369/44.32 |
| 5,384,676 | 1/1995 | Yokoyama et al. | 360/77.13 |
| 5,396,478 | 3/1995 | Krantz | 369/44.41 |
| 5,426,545 | 6/1995 | Sidman et al. | 360/78.09 |
| 5,483,510 | 1/1996 | Ogino | 369/44.34 |

FOREIGN PATENT DOCUMENTS 362264445A  11/1987  Japan .

OTHER PUBLICATIONS

B. Fiorino et al., "Track–Crossing Detection and Seek–Direction Sensing", *IBM Technical Disclosure Bulletin*, vol. 33, No. 10A, Mar. 1991, pp. 398–403.

N. Bui et al., "Prevention of Seeking and Tracking Errors due to Media Data", *IBM Technical Disclosure Bulletin*, vol. 37, No. 8, Aug. 1994, p. 639.

*Primary Examiner*—Thang V. Tran
*Attorney, Agent, or Firm*—Gary Cary Ware Freidenrich

[57] ABSTRACT

The invention provides a system for compensating for hard sector noise degradation of tracking error signals in an optical data storage system. The system includes a hard sector detection circuit which generates a first output signal in response to receiving a first input signal representing detection of a hard sector on a magneto-optical disk; a logic circuit which generates a second output signal in response to receiving the first output signal and a second input signal; and a tracking error signal reconstruction circuit which generates an approximated tracking error signal in response to receiving a tracking error signal and the second output signal. The invention may be embodied as hardwired circuitry or as a combination of hardware and software embodied in a computer readable medium and implemented in a digital computer.

18 Claims, 11 Drawing Sheets

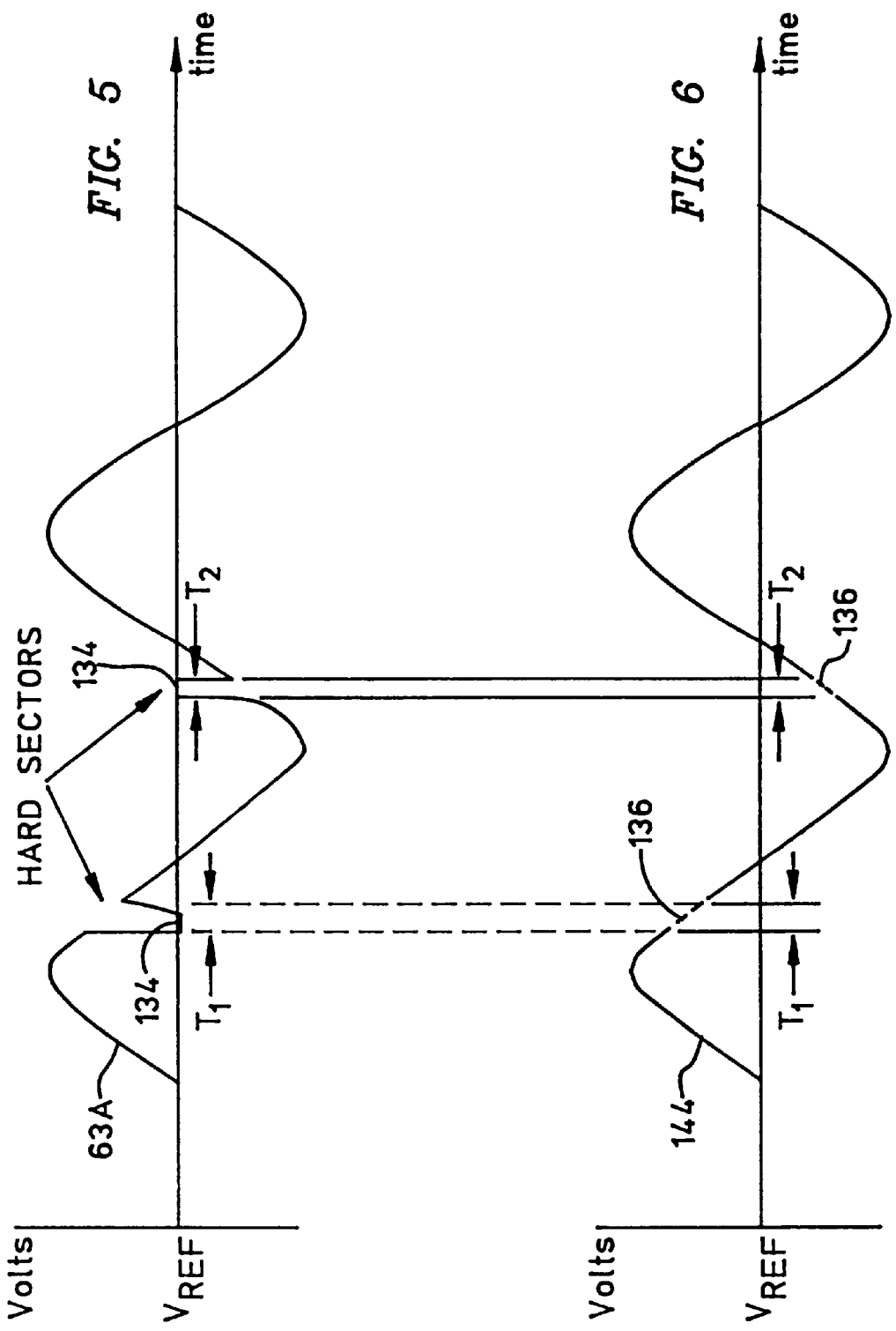

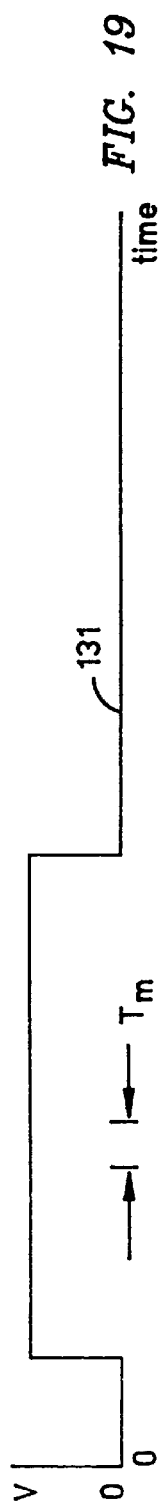
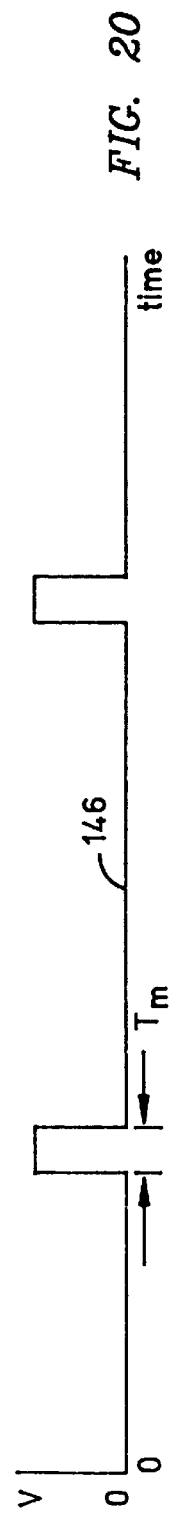
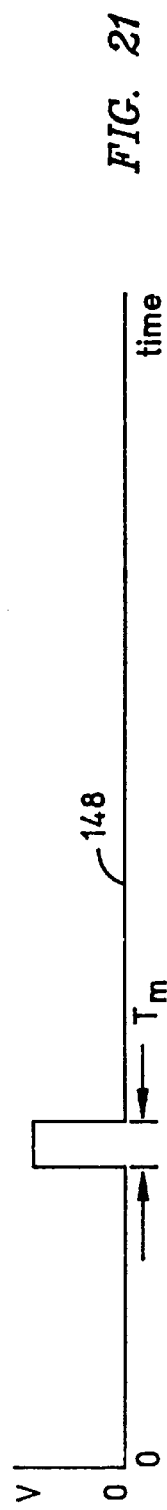
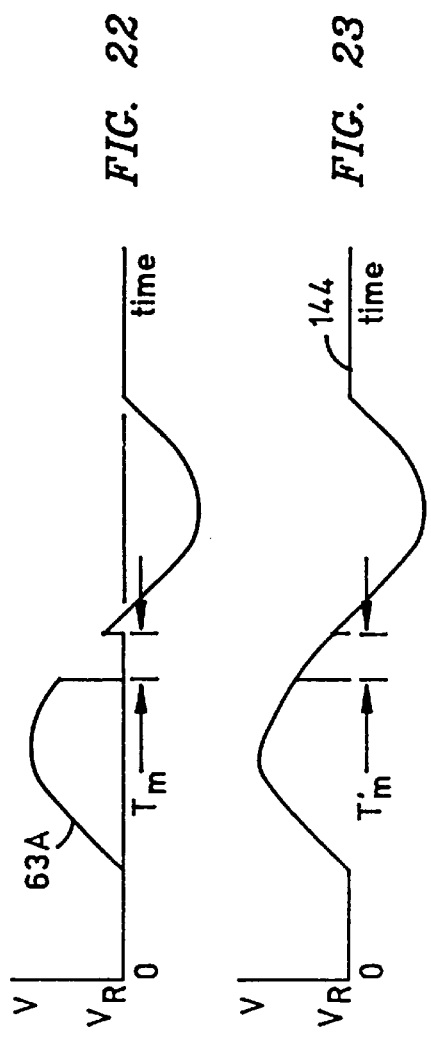

SYSTEM FOR COMPENSATING FOR HARD SECTOR NOISE DEGRADATION OF TRACKING ERROR SIGNALS IN AN OPTICAL DATA STORAGE SYSTEM

This application is a divisional of an application Ser. No. 08/803,549, filed Feb. 20, 1997, now U.S. Pat. No. 5,936,919.

BACKGROUND OF THE INVENTION

1. Field of the Invention

The present invention relates to optical disk drive systems, and more particularly, to a system which corrects for disturbances of a tracking error signal caused by pre-formatted sector information on a magneto-optical disk.

2. Description of the Related Art

Optical data drive systems, including compact audio disk players and computer data storage devices, employ collimated light, such as a laser beam, to write to and/or read from a rotating optical disk which is capable of storing great amounts of data. The data is accessed by focusing a laser beam onto the disk and then detecting the information encoded in the reflected light beam. Various kinds of optical systems are known, including read only memory (ROM), write once read many (WORM), and erasable. The erasable systems include magneto-optic (MO) and phase change recording media.

In an optical disk drive system, data is generally stored in either of two configurations. In one configuration, data is stored on a series of concentric tracks formed on an optical disk. Random access to a particular area of the disk (and thus to particular data), is accomplished by scanning the laser beam radially across the tracks on the disk so that the desired track is located, and then scanning along the track until a particular area or sector of interest on the disk may be interrogated by the laser beam. In the second configuration, data is stored on a single, spiral track. Random access to the spiral track is accomplished in a manner similar to that for circular tracks. The laser beam scans radially across the boundaries of adjacent spiral track revolutions to locate a desired revolution until the particular area, or sector of interest on the disk is reached.

The laser beam must be properly focused on the disk while simultaneously following the data tracks. The focus is maintained by moving an objective lens through which the laser beam is directed relative to the disk using a focus actuator. The tracking position is adjusted by moving an optical head over the rotating optical disk, from which the laser beam is generated, in a radial direction with respect to the tracks on the disk using a linear actuator. The optical head typically also contains the focus lens, a focus actuator and a beam bender mirror. Various focus and tracking servo schemes are known in the art.

One of the most widely used track servo schemes uses tracking grooves. The data track regions are also referred to as lands. The tracking grooves are molded into the disk on either side of each data track. Grooves may be V-shaped or trapezoidal shaped. The focused laser beam has a Gaussian diameter comparable to the land width and is directed to the grooved structure of the disk. Diffraction of the laser beam caused by the grooves produces different intensity distributions between the zero, and plus or minus first diffraction orders depending upon the radial position of the beam spot with respect to the grooves. Generally, more intensity is diffracted into the first orders as the beam moves away from a land section and toward the groove section. These light intensity distributions are imaged onto a servo controlled optical detector and are used to generate a tracking error signal (TES) which in turn controls the linear actuator that positions the optical head in order to keep the beam on track. The same optical detector is commonly also used to generate a focus error signal (FES). The FES is used to control the focus actuator to maintain the light beam in focus on the disk.

A problem develops when an optical disk drive performs a seeking operation in order to scan, or interrogate a specific sector of a particular track. Disturbances of the tracking error signal (TES) caused by pre-formatted sector information, or hard sectors can cause seeking errors. The internal electronic "seek" circuitry of the drive relies upon an accurate count of each track crossed as the objective lens scans across the rotating optical disk. The tracking error signal from an optical disk in the absence of pre-formatted sector information resembles a sine wave. Each zero crossing of the sine wave like TES signal represents a crossing of either the center of a land or groove area of the track feature. The electronic tracking circuitry relies upon the zero crossings to accurately determine the number of data tracks traversed during the time the tracking error loop is operating in the open loop mode. Similarly, when the "seek" operation is being completed and the tracking servo begins closed loop operation, the electronic tracking circuitry "locks" on the zero crossing of the TES signal. The TES signal is corrupted when the focused spot of the laser beam interrogates a hard sector region on the optical disk, causing the voltage amplitude of the TES signal to inappropriately go to zero. When the optical disk drive system is operating in a "seek" mode, such inappropriate zero value of the TES signal can cause the track counter to incorrectly count the number of tracks traversed, resulting in a "seek" error. The disturbance of the TES signal can also cause the seek circuitry to begin closed loop operations at the wrong time relative to the zero crossing, which may also result in a seek error. The net effect is a reduction in "seek" performance and reliability.

Therefore, a need exists for a system which can overcome the problem of seeking errors caused by disturbances of the tracking error signal resulting from detection of pre-formatted sector information in an optical disk drive system.

SUMMARY OF THE INVENTION

The present invention overcomes the aforesaid problems by implementing an electronic circuit to compute the approximate TES signal during the time hard sector disturbances degrade the real TES signal. The approximate TES signal is computed by a linear interpolation process and is substituted for the real TES signal during the time a hard sector is detected. The invention employs one circuit to detect when hard sectors are being detected on an MO disk, and another circuit to provide the interpolation of the TES signal.

In one implementation of the present invention, a hard sector detection circuit uses the ROM output from a data preamplifier to sense the presence of a hard sector. The ROM signal is followed by a peak detector, an amplitude threshold sensor, and a pulse width threshold circuit. The peak detector provides a quick charge-up time and a slow charge-down time so that the output of the peak detector follows the peaks of the high frequency content of the ROM signal representing detection of the hard sector. The output of the peak detector is a pulse with a duration somewhat longer than a typical hard sector pulse. The amplitude threshold and pulse width threshold circuits provide noise immunity so that noise spikes do not inadvertently simulate a hard sector detected condition.

The TES interpolation circuit is activated for the duration of the time that the hard sector detection circuit produces an output pulse. The TES interpolation circuit operates by continuously computing the rate of voltage change (dV/dt) of the TES signal using an analog differentiator. The differentiator is followed by a first order sample-and-hold circuit that is set to a hold-mode only when a hard sector is detected. The sample-and-hold circuit is followed by an integrator with pole and zero locations set to cancel the effect of the differentiator circuit. In the absence of hard sectors, the original TES signal passes through the circuits unaffected. However, when a hard sector is detected, the sample-and-hold captures the last value of the TES slope ($dV_{TES}/dt$). The integrator then integrates the slope with respect to time, providing a linear interpolation of the TES signal during the time the hard sector is detected. FIG. 6 illustrates a synthesized, or reconstructed TES signal during the periods $T_1$ and $T_2$. The invention provides an approximated TES signal that is very similar to the TES signal that would have existed had no hard sectors been detected.

The invention may also be implemented as a digital system using a combination of both hardware and software which may be stored on a computer readable medium.

The invention advantageously overcomes the problem in optical disk drive systems of seeking errors caused by disturbances of the tracking error signal resulting from detection of pre-formatted sector information on an optical disk.

Another important advantage of the invention is that it is able to reconstruct a tracking error signal in real time on an as-needed basis using simple to implement differentiating and integrating techniques.

These and other advantages of the invention will become more readily apparent upon review of the accompanying drawings and specification, including the claims.

BRIEF DESCRIPTION OF THE DRAWINGS

FIG. 5 shows a tracking error signal affected by detection of hard sectors on a magneto-optical disk.

FIG. 6 shows a synthesized tracking error signal reconstructed by integrating the TES signal of FIG. 5.

FIGS. 19–23 are timing diagrams illustrating the operations of various elements of the TES reconstruction and logic circuits.

Throughout the several views, like references refer to like elements.

DESCRIPTION OF THE PREFERRED EMBODIMENTS

Figure 1:
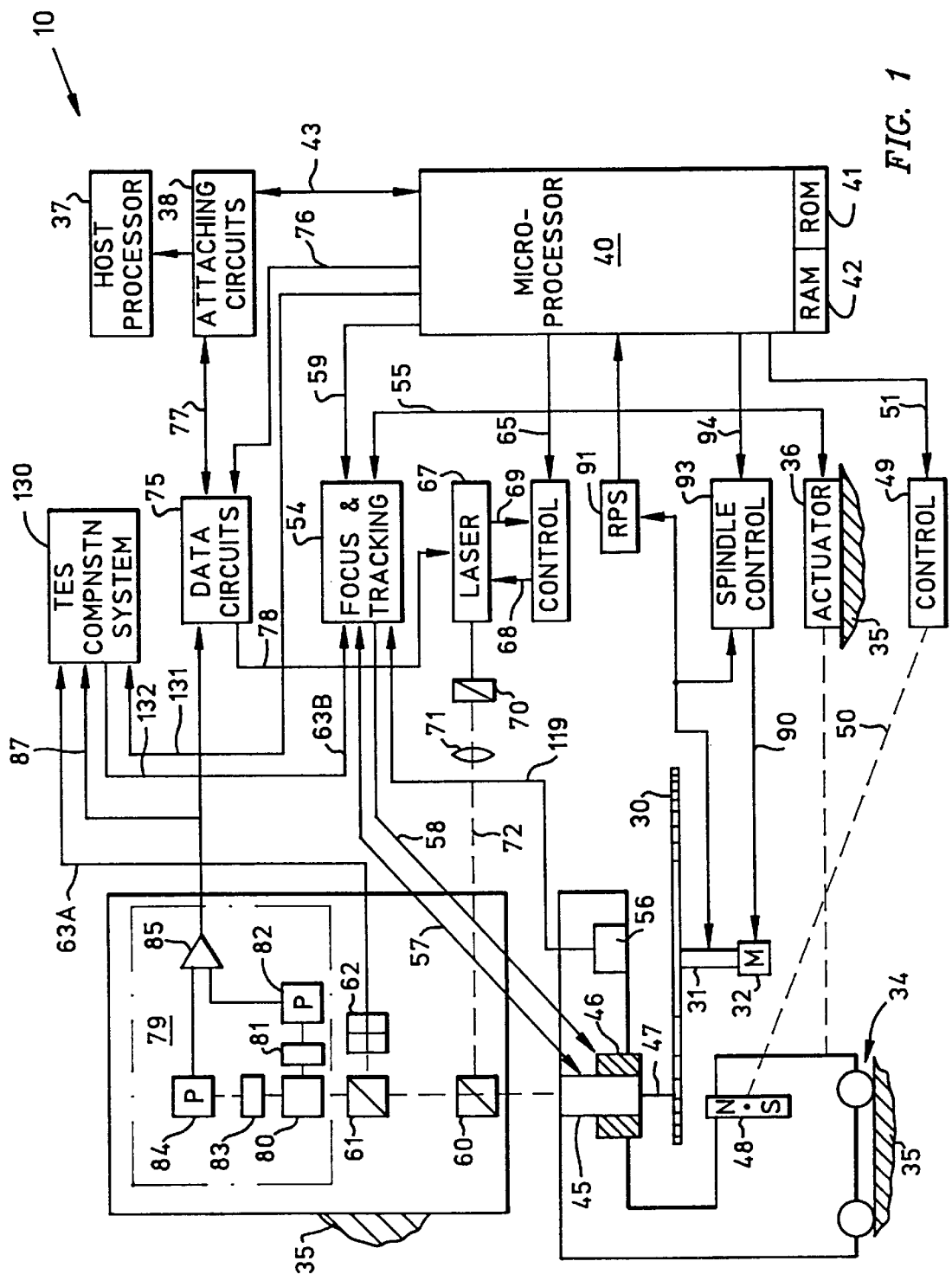
FIG. 1 illustrates an optical disk drive system incorporating a system for compensating for hard sector noise degradation of tracking error signals embodying various features of the present invention.

Referring to FIG. 1, there is shown an optical disk drive system 10 which includes a tracking error signal (TES) compensation system 130 for compensating for hard sector noise degradation of tracking error signals. The operation of optical disk drive system 10 and all of its elements, except for TES compensation system 130, are described in detail in commonly assigned U.S. Pat. No. 5,220,546, incorporated herein by reference. TES compensation system 130 receives tracking error signal (TES) 63A from quad-detector 62, hard sector detection input signal 87 generated by differential output amplifier 85, and a "seek" or JUMP signal 131 generated by microprocessor 40 when the optical disk drive system is operating in a "seek" mode, also described in U.S. Pat. No. 5,220,546. The signal 87 encodes information from which TES compensation system 130 determines whether a hard sector has been detected on the magneto-optical (MO) disk 30. The JUMP signal 131 is a logic signal that indicates whether the laser beam 72 which scans the disk 30 is to be directed across tracks of the disk. The output of TES compensation system 130 is a tracking error signal 63B which is provided to focus and tracking system 54; TES signal 63B may be characterized by one of four types of signals which are identified in the bottom row of TABLE 1, depending on the logic levels of signals 131 and 146, as described further herein.

Figure 2:
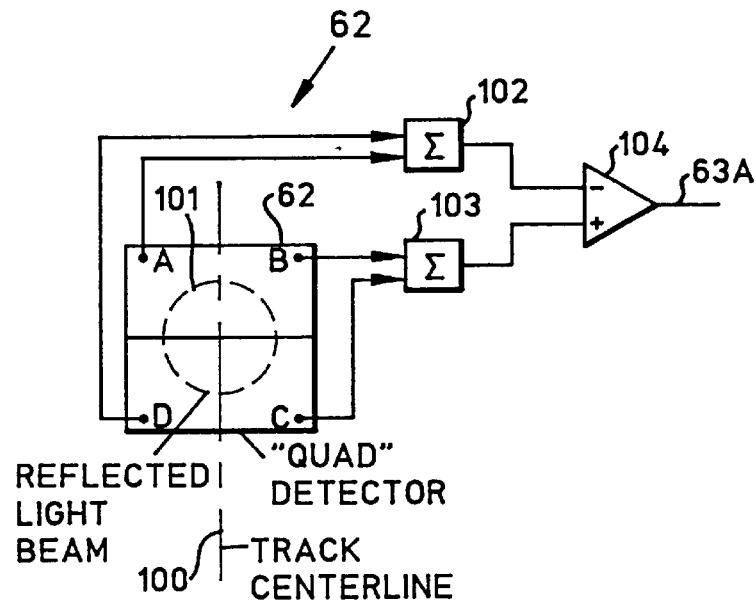
FIG. 2 illustrates a quad-photodetector circuit for generating a tracking error signal (TES) in the optical disk drive system of FIG. 1.

The generation of TES signal 63A is described with reference to FIGS. 2 and 3. Quad-detector 62 has four independent photo-responsive elements A, B, C and D. The elements A and D are connected to analog current summing circuit 102 to supply the sum signal (A+D) to the positive input of differential amplifier 104. Similarly, the output signals of elements B and C are connected to a second circuit summing circuit 103, which, in turn, supplies its sum signal (B+C) to the negative input of differential amplifier 104. The difference between the current sums (A+D) and (B+C) is provided as tracking error signal 63A by differential amplifier 104. The element pairs (A,D) and (B,C) of quad-detector 62 may be separated by a track center line 100, shown in FIG. 4, being irradiated at spot 101 by the laser beam 72 reflected off the rotating disk 30. The recording tracks may be located either in the grooves, as shown, or the mesas 115. During track following, the relative position of a track center line 100, 110 or 111, moves with respect to the elements A, B, C and D, resulting in different light intensities of the reflected laser beam 72 on the element pairs (A,D) and (B,C). The different intensities result in TES 63A being idealized as a sine wave, as exemplified in FIG. 4.

Figure 3:
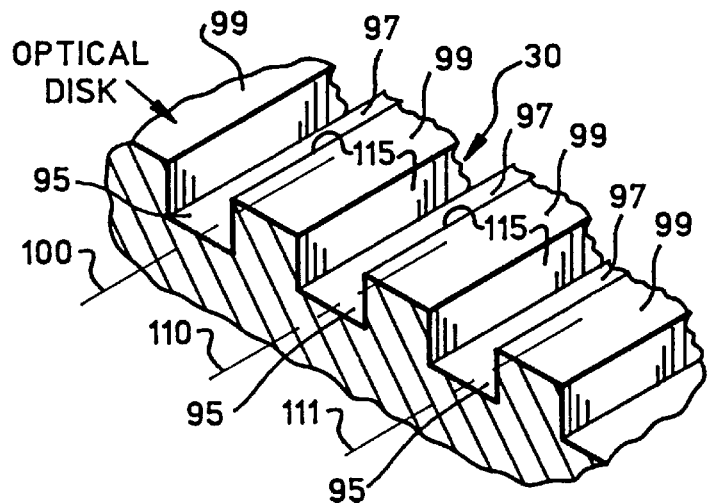
FIGS. 3 and 4 show how an idealized tracking error signal (TES) corresponds to the groove structure of a magneto-optical disk.
Figure 4:
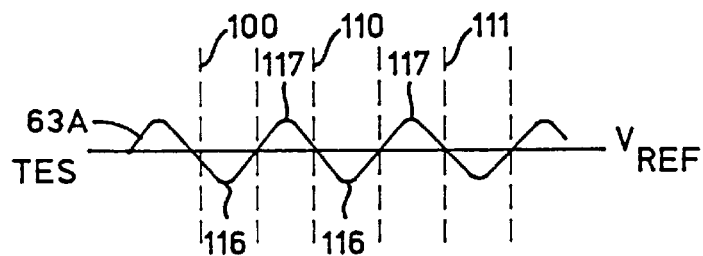

FIG. 3 shows a cut-away section of the MO disk 30, wherein the tracks 95 are shown aligned with the arcuate shaped grooves 97, appearing to be straight due to their small arc lengths. Track center lines 100, 110, and 111 lie along the center of the respective grooves 97. As the laser beam 72 interrogates the MO disk 30, and is focused on the tracks 95 in the grooves 97, the maximum reflected laser light intensity capable of being reflected to the quad-detector 62 is indicated by spot 101 (FIG. 2). Referring to FIGS. 3 and 4, as the laser beam 72 scans across a track 95, the intensity of the laser beam 72 decreases as it passes over a zero axis crossing 115 at the vertical boundaries of the grooves 97 and the mesas 99, reaching positive peaks 117 and negative peaks 116 at the groove-mesa boundaries 115.

The TES signal 63A exemplified in FIG. 4 is idealized as a sine wave. However, as the laser beam 72 scans a hard sector (not shown) on the MO disk 30, the magnitude of the voltage level of the TES signal 63A decreases to the reference voltage, $V_{Ref}$, generally zero volts, which causes the problems previously described herein. FIG. 5 shows a TES signal 63A affected by hard sectors which may, for example, cause the voltage magnitude of TES signal 63A to approach $V_{Ref}$ at sections 134 during each of time intervals $T_1$ and $T_2$. FIG. 6 shows a reconstructed signal 144 which has reconstructed and interpolated sections 136 for the intervals $T_1$ and $T_2$ so that signal 144 fairly accurately represents signal 63A which has been affected by hard sectors, as shown in FIG. 5. Therefore, system 10 illustrated in FIG. 1 advantageously includes a TES compensation system 130 which corrects the TES signal for any signal degradation caused by detection of hard sectors by the laser beam 72.

Figure 7:
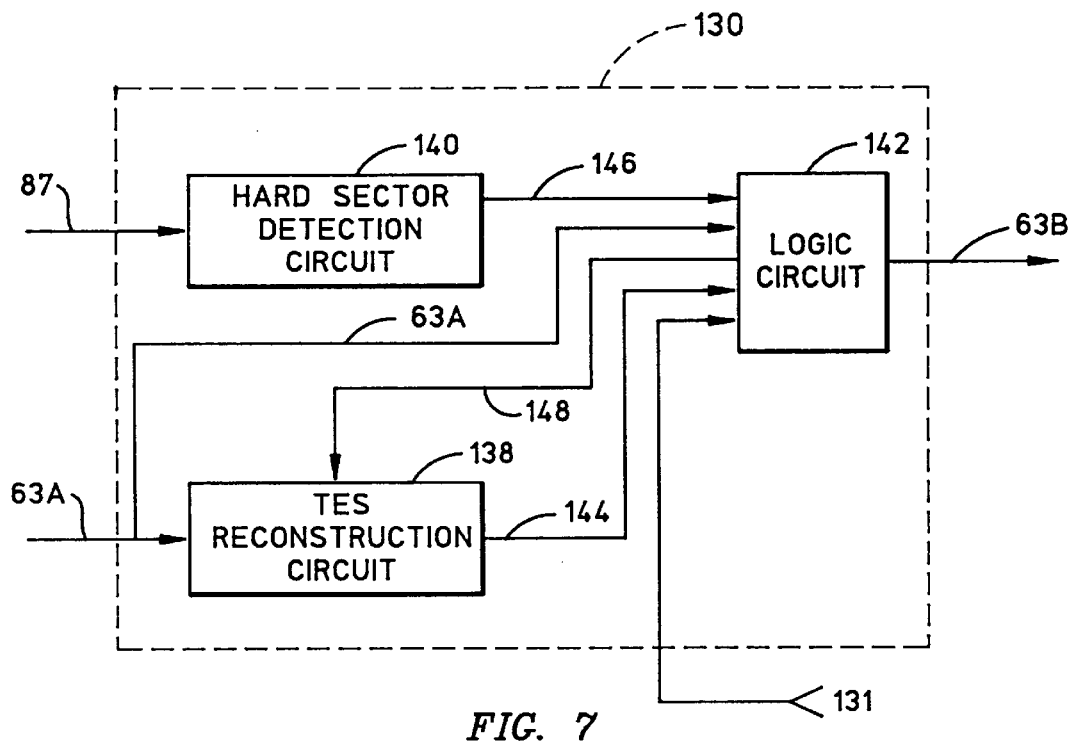
FIG. 7 is a block diagram of the system 130 for compensating for hard sector noise degradation of tracking error signals used in the optical disk drive system of FIG. 1.

Referring to FIG. 7, there is shown TES compensation system 130 which compensates for hard sector noise degradation of tracking error signals in the optical data storage system 10 shown in FIG. 1. System 130 includes a TES reconstruction circuit 138, a hard sector detection circuit 140 and a logic circuit 142. TES signal 63A, generated by quad-detector 62, is received by TES reconstruction circuit 138 and logic circuit 142. Hard sector detection circuit 140 generates an output signal 146, preferably having a logic HIGH voltage level when circuit 140 determines that input signal 87 provided from differential amplifier 85 (FIG. 1) indicates that laser beam 72 is scanning a hard sector on the disk 30. However, signal 146 preferably is a logic LO when hard sector detection circuit 140 does not detect a hard sector from signal 87. Logic circuit 142 generates an output signal 148 having a predetermined logic level, such as a logic HIGH, when logic circuit 142 receives both: 1) a JUMP signal 131 preferably having a logic HIGH voltage level from microprocessor 40 indicating that the laser beam 72 is being directed to jump tracks on MO disk 30, and 2) the logic HIGH signal 146 from the hard sector detection circuit 140. By way of example, when signal 148 is a logic HIGH, TES reconstruction circuit 138 generates a reconstructed TES signal 144 which interpolates sections of the TES signal 63A which have been affected by detection of hard sectors by the laser beam 72. If, however, signal 131 from microprocessor 40 (FIG. 1) is a logic LO, indicating that the system 10 is not operating in a "seek" mode (when the laser beam 72 is not directed to scan or jump across tracks such as tracks 110, 110, 111, etc., on MO disk 30), then the TES signal 63A is throughput directly through the logic circuit 142 and output as signal 63B, regardless of whether signal 146 is a logic LO or a logic HIGH. If, however, signal 131 is a logic HIGH and signal 146 is a logic LO, then the TES reconstruction circuit 138 differentiates and integrates the TES signal 63A without any interpolation. The operation of TES compensation system 130 is summarized in TABLE 1.

TABLE 1

CHARACTERIZATION OF OUTPUT SIGNAL 63B AS A FUNCTION OF THE LOGIC STATES OF SIGNALS 131 AND 146

| Signal Name | Case No. 1 | Case No. 2 | Case No. 3 | Case No. 4 |
| --- | --- | --- | --- | --- |
| Jump signal 131 | Logic HIGH | Logic HIGH | Logic LO | Logic LO |
| HS Detect Signal 146 | Logic HIGH | Logic LO | Logic LO | Logic HIGH |
| Output Signal 63B | Integrate & Interp. d(TES)/dt | Integrate d(TES)/dt wo/Interp. | Throughput TES Signal | Throughput TES Signal |

Figure 8:
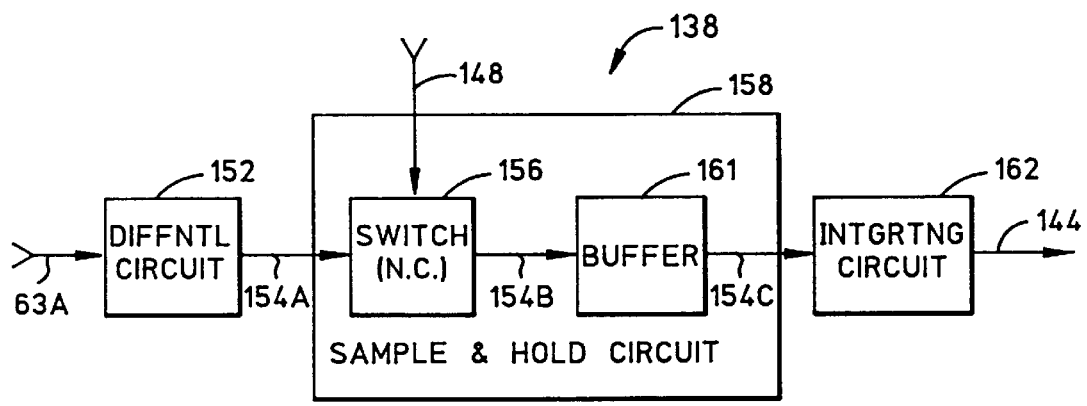
FIG. 8 is a block diagram of the TES reconstruction circuit 138 of FIG. 7.

Referring to FIG. 8, TES compensation circuit 138 includes a differentiating circuit 152, a sample-and-hold circuit 158 having a normally closed switch connected to a buffer 161, and integrating circuit 162. Differentiating circuit 152 transforms an input signal, such as a tracking error signal (TES) 63A, into a time differentiated TES signal 154A. The time differentiated TES signal 154 is throughput via normally closed switch 156 to and stored by the buffer 161 when the switch 156 is closed. However, the differential circuit is isolated from the integrating circuit 162 when switch 156 is open. The state of switch 156 is controlled by input signal 148. For example, switch 156 is normally closed when input signal 148 is a logic LO, and is open when signal 148 is a logic HIGH. As previously stated, input signal 148 is a logic HIGH when the output signal 146 indicates that the hard sector detection circuit 140 has detected a "hard sector" on magneto-optical ("MO") disk 30, and the value of JUMP signal 131 generated by the microprocessor 40 is a logic HIGH, indicating that the MO disk system 10 is operating in the "seek" mode. When switch 156 is closed, the buffer 161 stores the generally instantaneous value of the time differentiated TES signal 154B. However, when switch 156 is open, the buffer 161 stores the last valid value of the time differentiated TES signal 154B at the time when switch 156 changed from a normally closed state to an open state. The integrating circuit 162 generates an integrated output signal 144 that is the integral of the time differentiated TES signal 154C stored in sample-and-hold 158 during the period when signal 148 is a logic HIGH. Thus, integrated TES signal 144 is essentially an approximation of the TES signal 63A as though signal 63A has not been affected by detection of hard sectors.

Figure 9:
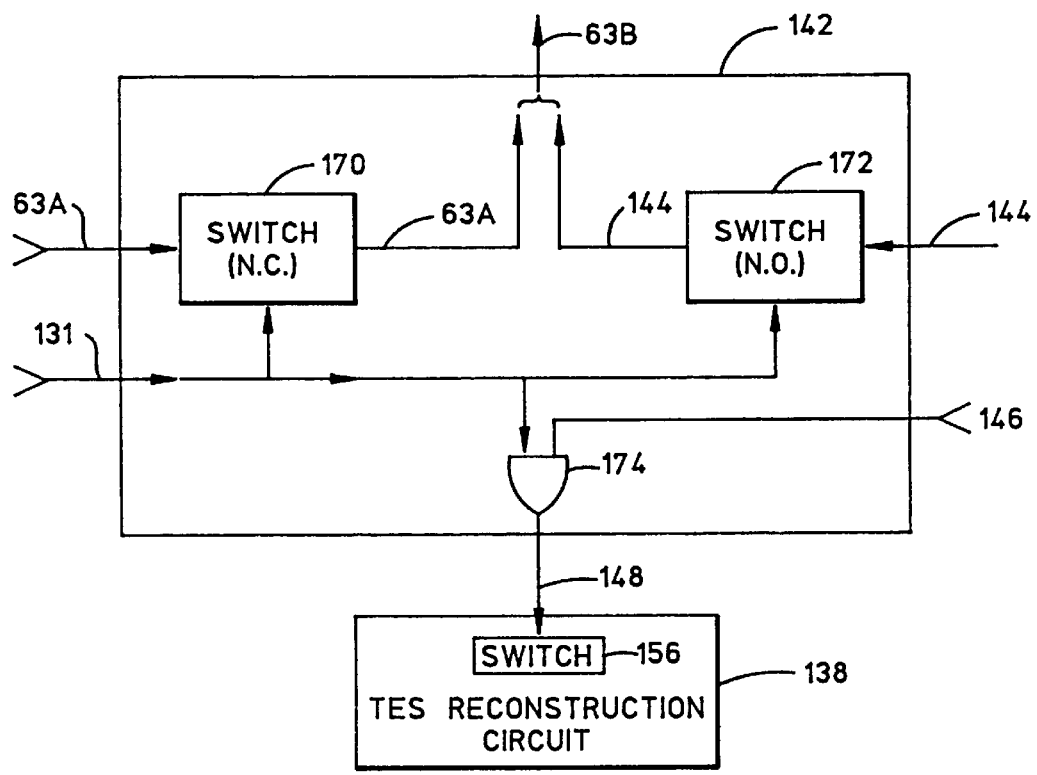
FIG. 9 is a block diagram of the logic circuit 142 of FIG. 7.

The logic circuit 142, described with reference to FIG. 9, includes a normally closed switch 170, a normally open switch 172 and an AND gate 174. Normally closed switch 170 throughputs TES signal 63A when signal 131 from microprocessor 40 is a logic LO, indicating that the optical disk system 10 is not operating in a "seek" mode. However, when signal 131 is a logic HIGH, then switch 170 is open, thereby preventing TES signal 63A from being directly throughputted out of the logic circuit 142. When signal 131 is a logic HIGH, then normally open switch 172 closes so that the integrated output signal 144 from TES reconstruction circuit 138 is output from the logic circuit 142. When both JUMP (also referenced as "seek") signal 131 and signal 146, generated by hard sector detection circuit 140, are both a logic HIGH, then the output signal 148 of AND gate 174 is a logic HIGH, causing normally closed switch 156 of TES reconstruction circuit 138 to be in the open state.

Figure 10:
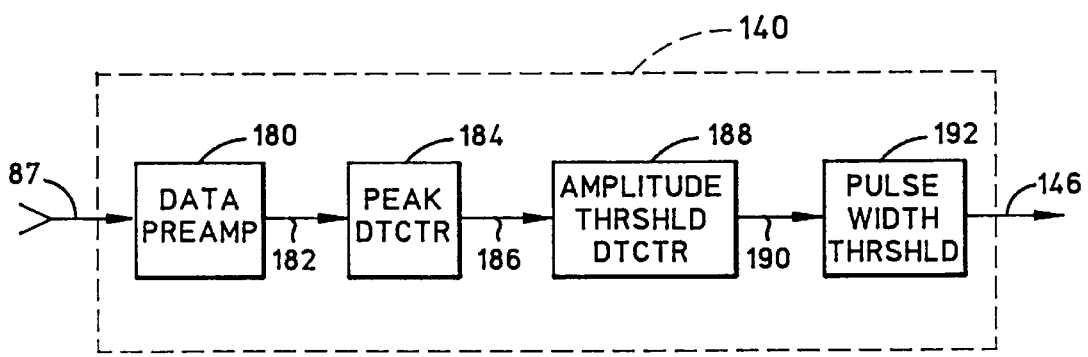
FIG. 10 is a block diagram of the hard sector detection circuit 140 of FIG. 7.
Figure 12:
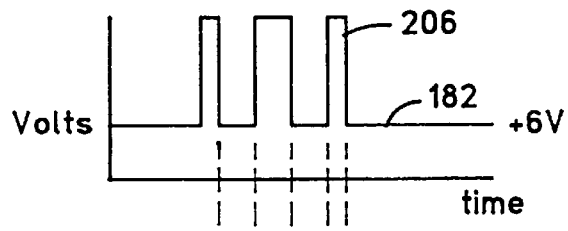
FIGS. 12–17 are timing diagrams illustrating the operations of various elements of the hard circuit detection circuit.
Figure 13:
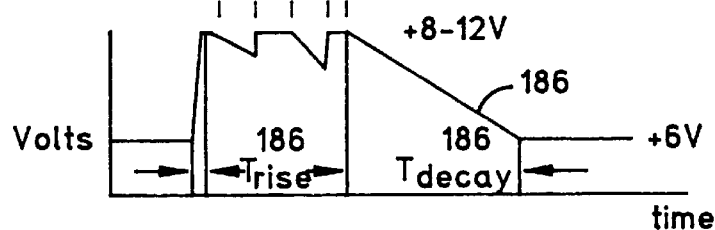
Figure 17:
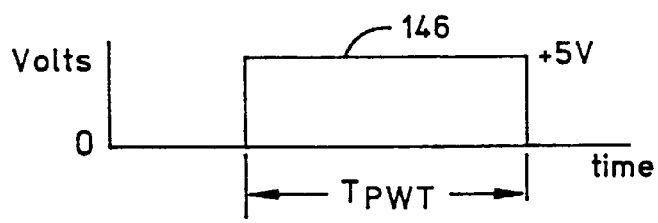

Referring to FIG. 10, hard sector detection circuit 140 includes data preamplifier 180, peak detector 184, amplitude threshold detector 188, and pulse width threshold detector 192. The hard sector detection circuit 140 uses signal 87, exemplified in FIG. 12, to determine when hard sectors are detected on MO disk 30. The data preamplifier 180 transforms signal 87 provided by differential amplifier 85 into an amplified signal 182, exemplified in FIG. 12. Peak detector 184 transforms the peak values of signal 182 into a signal 186 representing the peaks of signal 182, as represented in FIG. 13. Amplitude threshold circuit 188 transforms the peak values of signal 186 into a signal 190 representing the values of signal 186 that exceed a threshold value, as for example, a signal that preferably represents the 80th percentile and more of the peak values of signal 186. Signal 190 is represented, by way of example, in FIG. 15. Pulse width threshold circuit 192 acts as a pulse width filter so that only those pulses of signal 190 having widths which exceed some limit, as for example, greater than about 2 microseconds, cause the pulse width threshold circuit 192 to generate an output signal 146 preferably having a logic HIGH state indicating that the hard sector detection circuit has detected a hard sector from input signal 87. The signal 146 (FIG. 17) preferably has a pulse width, $T_{PWT}$, in the range of 40–80 microseconds. As shown in FIG. 9, the output signal 146 is provided as an input to AND gate 174 of logic circuit 142, described above.

Figure 11:
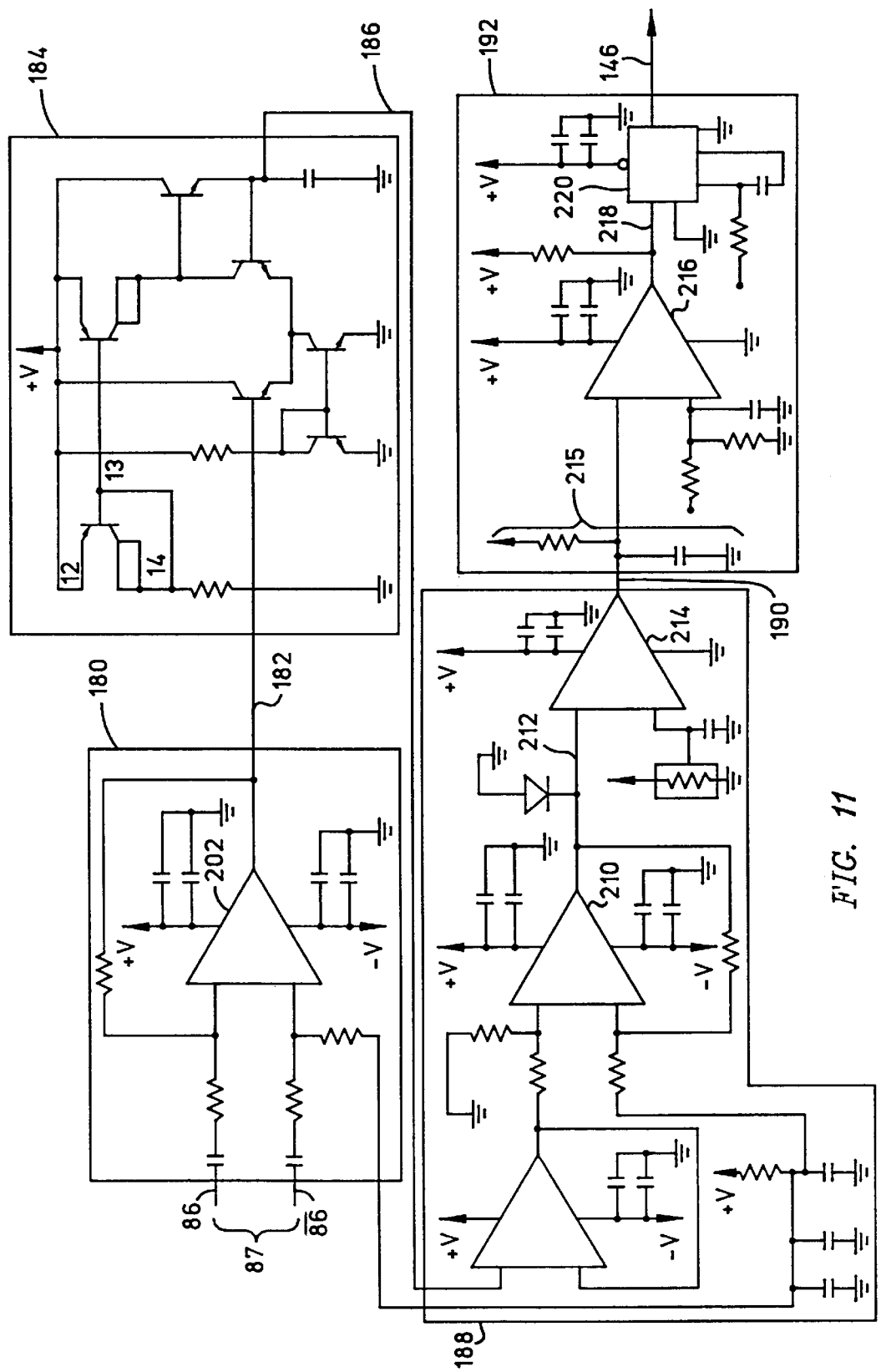
FIG. 11 is an example of an electrical circuit for implementing the hard sector detection circuit.

The hard sector detection circuit 140 may be implemented as shown and described with reference to FIG. 11. Signal 86 and its complement, signal $\overline{86}$, together comprise signal 87 and are generated by differential output amplifier 85. Signals 86 and $\overline{86}$ are both provided to differential amplifier 202 of data preamplifier 180 which generates single ended output signal 182, typically comprised of a series of pulses 206, as shown in FIG. 12, having a bandwidth generally in the range of about 20–40 MHz. By providing both signals 86 and $\overline{86}$ to differential amplifier 202, any noise present in signal 87 is generally canceled out. Single ended output signal 182 is provided to the peak detector circuit 184, which may be implemented, by way of example, as shown in FIG. 11. The output signal 186 of the peak detector circuit 184 is shown in FIG. 13.

Figure 14:
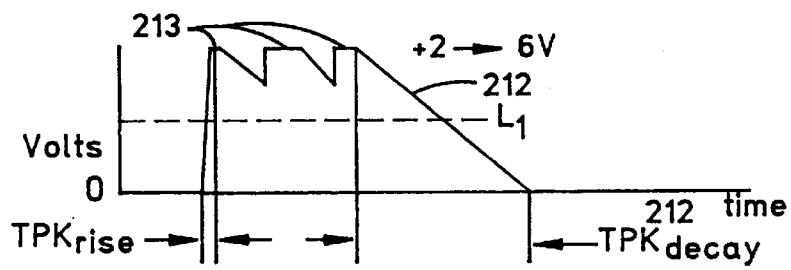
Figure 15:
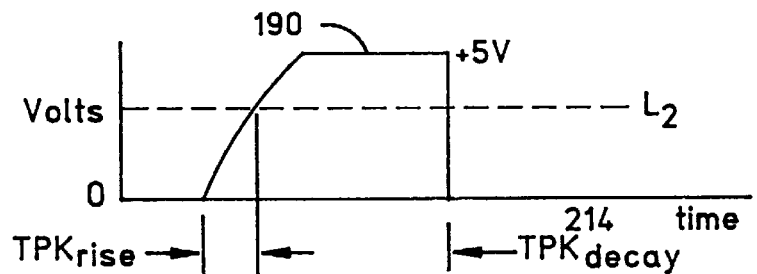
Figure 16:
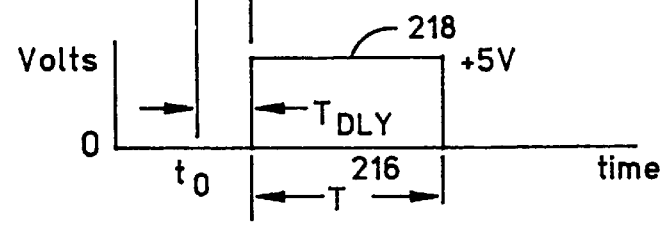

The output signal 186 generated by the peak detector circuit 184 is directed to a differential amplifier 210 of amplitude threshold detector circuit 188. The differential amplifier 210 generates an output signal 212 having peak values 213 in the range of 2–6 volts, represented in FIG. 14, and a waveform characterized by a very fast rise time constant, $TPK_{210\ rise}$, and a much slower decay time constant, $TPK_{210\ decay}$, so that signal 212 represents a good sampling of the peak values of the signal 182. By way of example, $TPK_{210\ decay} > 100 \ast TPK_{210\ rise}$, as established by the peak detection circuit 184. Comparator amplifier 214 transforms signal 212 into output signal 190 which may have a peak value of about 5 volts, as exemplified in FIG. 15, a relatively slow rise time constant $TPK_{214\ rise}$ of about 2 microseconds, and a very fast decay time constant, $TPK_{214\ decay}$ so that signal 190 discharges quickly. The output signal 190, exemplified in FIG. 15, of the amplitude threshold detector 188, typically has a voltage amplitude generally in the upper 20 percent range of the amplitude of signal 186. With reference to FIGS. 14 and 15, when the voltage amplitude of signal 212 equals or exceeds a threshold level, $L_1$, signal 190 increases to a voltage logic level which may be +5 volts, for example. However, when the voltage amplitude of signal 212 drops below threshold level $L_1$, the voltage amplitude of signal 190 discharges to zero almost instantaneously.

Pulse width threshold circuit 192 may be implemented, by way of example, as shown, in FIG. 11. The pulse width threshold circuit 192 transforms signal 190 into an output signal 146 having a predetermined pulse width, $T_{PWT}$, for example, in the range of about 60 to 80 microseconds. Comparator 216 of pulse width threshold circuit 192 generates a generally rectangular pulse 218 having, for example, a +5 volt logic level and a pulse width $T_{216}$ in the range of about 20 to 40 microseconds. The generation of signal 218 by comparator 216 is delayed by a time period, $T_{DLY}$, established by the RC circuit 215, from the time to when signal 190 begins increasing from a reference voltage level, such as 0 volts. The time delay $T_{DLY}$, assures that noise components in the signal 190 do not falsely indicate detection of a hard sector, causing signal 146 to be inappropriately triggered. In other words, the time delay $T_{DLY}$, enhances the probability that actual detection of a hard sector results in the generation of signal 146. The output signal 218 then is provided to a multistate vibrator 220 which generates signal 146 (FIG. 17) comprising a pulse having a pulse width preferably having a pulse period $T_{PWT}$ of approximately 60 to 80 microseconds.

In general, the pulse width of signal 146 is about 40 microseconds longer than the pulse width of signal 218. Another reason for the time delay $T_{DLY}$ is to assure that the TES interpolation signal 144 is not interrupted if a hard sector no longer is being detected by hard sector detection circuit 140, given that the bandwidth of the hard sector detection circuit is much greater than the bandwidth of focus and tracking circuit 54.

Figure 18:
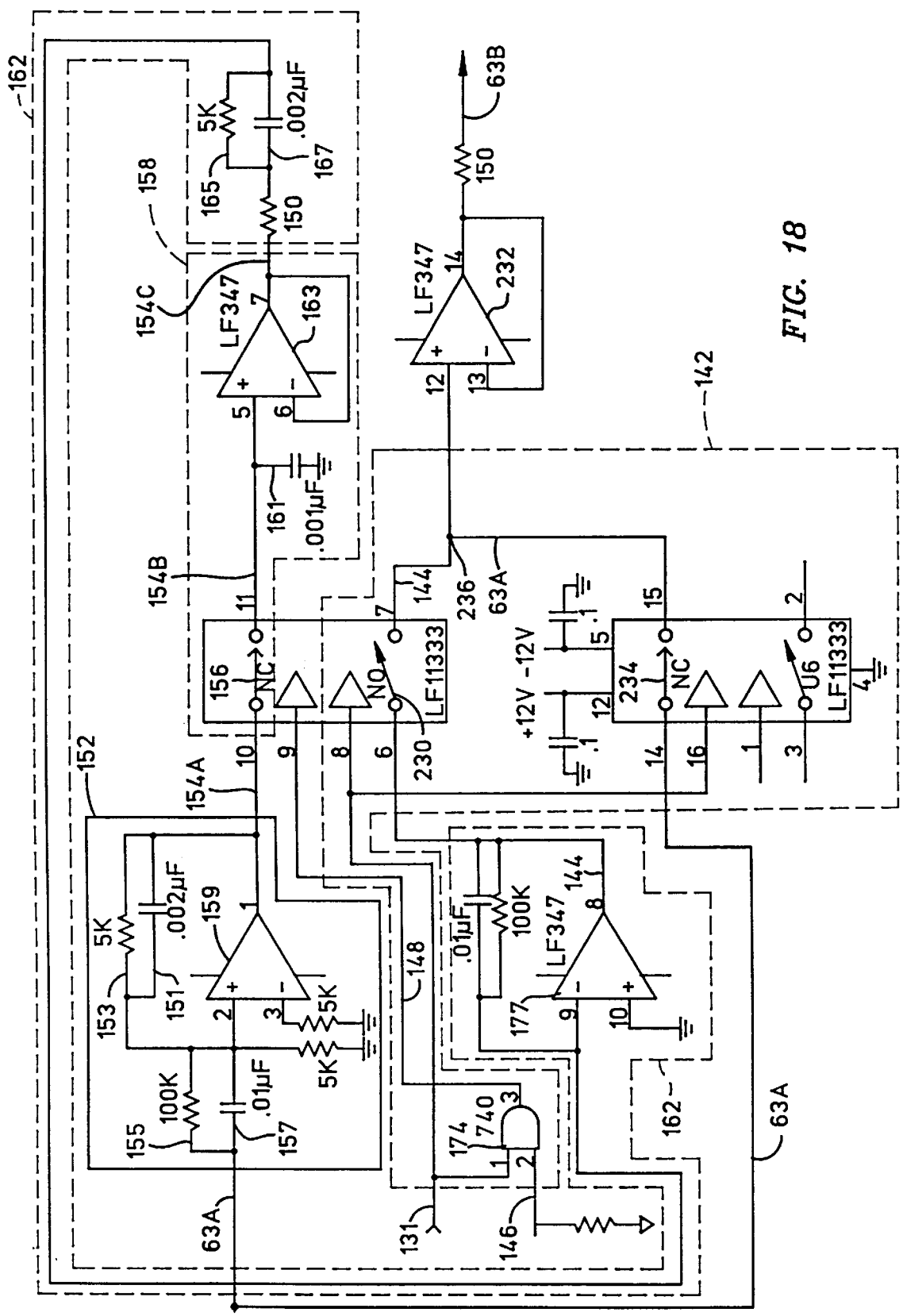
FIG. 18 is an example of an electrical circuit for implementing the TES reconstruction and logic circuits.

An electrical circuit for implementing the TES reconstruction circuit 138 and logic switching circuit 142 are shown, by way of example, in FIG. 18. Differential circuit 152 includes a low pass filter comprised of the parallel combination of a 5K ohm resistor 153 and 0.002 uf capacitor 151 to reduce noise in TES signal 63A. The filtered signal 63A is differentiated by operational amplifier 159 which provides time differentiated signal 154A to normally closed switch 156.

When closed, switch 156 throughputs time differentiated signal 154B, received as time differentiated signal 154A from differentiating circuit 152, to sample-and-hold circuit 158, comprising normally closed switch 156, buffer 161, which may be implemented as a 0.001 uf capacitor, and operational amplifier 163. However, switch 156 is in the "open" state when the values of JUMP signal 131 and the hard sector detect signal 146 both are a logic HIGH, which causes the output signal 148 of AND gate 174 of logic circuit 142 to be a logic HIGH. The 0.001 uf capacitor 161 comprising sample-and-hold circuit 158 stores the value of time differentiated signal 154. The operational amplifier 163 of circuit 158 provides a high impedance path for isolating the input signal 154B from the output signal 154C of amplifier 163. The parallel combination of a 5K ohm resistor 165 and 0.002 uf capacitor 167 of in TES rating circuit 162, and the parallel combination of 5K ohm resistor 153 and 0.002 uf capacitor 151 of differential circuit 152 together provide circuit 138 with a pole-zero cancellation.

The operation of TES reconstruction circuit 138 and logic circuit 142 exemplified in FIG. 18 is further described with reference to the timing diagrams of FIGS. 19–23. FIGS. 19, 20, and 21 collectively show that during the time interval $T_m$ when the voltage levels of JUMP signal 131 and hard sector logic signal 146 are both a logic HIGH, then the output signal 148 of AND gate 174 is also a logic HIGH. In such case, detection of a hard sector on MO disk 30, represented by hard sector detection signal 146, causes the voltage level of TES signal 63A to be at or near the reference voltage $V_R$, during the interval $T_m$, as shown in FIG. 22. However, as shown in FIG. 23, during the time interval $T_m$, the TES reconstruction circuit 138 provides an integrated, reconstructed signal 144 which is output through node 236 (FIG. 18) as signal 63B.

Operational amplifier 177 of integrating circuit 162 integrates signal 154, the output of sample-and-hold circuit 158. The integrated output signal 144 generated by operational amplifier 177 of integrating circuit 162 is directed to normally open switch 230 of logic circuit 142. When the value of JUMP signal 131 is a logic HIGH, normally open switch 230 of logic circuit 142 is closed so that integrated signal 144 is throughput to operational amplifier 232 when the value of jump signal 131 is high. Operational amplifier 232 provides a buffer between integrated output signal 144 and output signal 63B. However, if the value of JUMP signal 131 is a logic LO, then TES signal 63A is throughput directly through normally closed switch 234 of logic circuit 142 while normally open switch 230 remains open. Either one of TES signal 63A or integrated output signal 144 is presented to node 236 and then is buffered by operational amplifier 232 which generates buffered TES output signal 63B. The buffered output signal 63B represents either TES signal 63A or integrated output signal 144, depending on the values of input signals 131 and 146.

Figure 24:
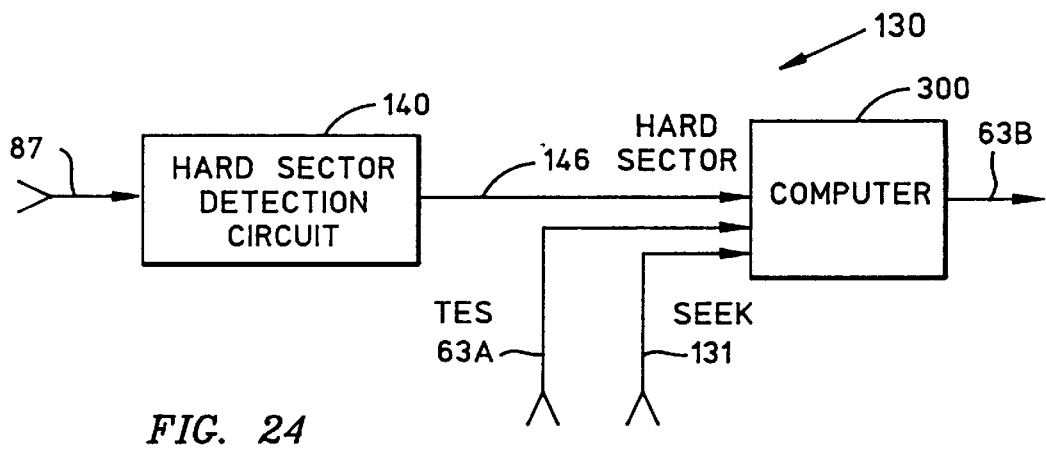
FIG. 24 illustrates a system for implementing the present invention which includes both hardware and software elements.

System 130 may also be embodied as a hardware/software combination, as shown in FIG. 24, to include hard sector detection circuit 140 which provides the hard sector output signal 146 to a digital data processor, or computer 300. Other inputs to the computer 300 include TES signal 63A and the JUMP signal 131. The computer 300 implements a computer executable program 302, represented in FIG. 25, which uses the levels of signals 131 and 146 as the inputs to determine the characteristics of the output signal 63B, as previously described. By way of example, program 302 preferably may be encoded on a computer ROM or on a diskette, magneto-optical disk, magnetic tape, and the like, which when read by computer 300, implements the method steps represented in FIG. 25.

Figure 25:
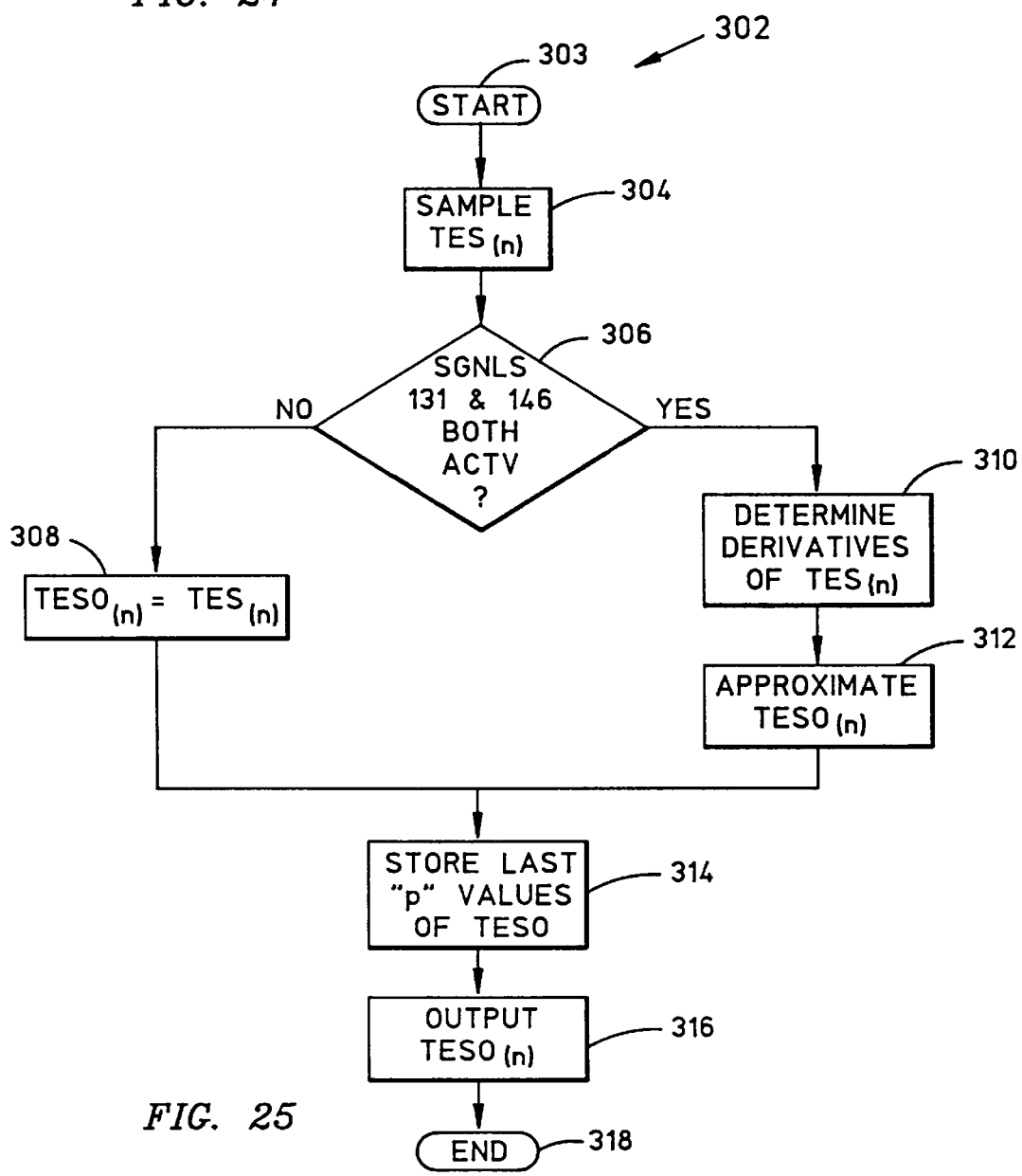
FIG. 25 illustrates an example of a software routine implemented in the computer shown in FIG. 24.

Referring to FIG. 25, there is shown a process represented by a flowchart 302 exemplifying a digital implementation of the invention. Commencing from step 303, the process 302 proceeds to step 304 where the digitized representations of the TES signal 63A, $TES_{(n)}$ are sampled, where n represents the most recent, periodic time sampling interval having a sample period, $T_S$. Then, at step 306, a determination is made as to whether signals 131 and 146 are both a logic HIGH. If the determination at step 306 is YES, then the process 302 proceeds to step 310 which determines kth order derivatives of the sampled TES signal, where k is a positive integer. From step 310, the process 302 continues to step 312 which determines an approximated TES output signal, $TESO_{(n)}$, for the most recent time sampling period. Then, at step 314, the last p values of TESO are stored, where p is a positive integer. At step 316, the most recent approximated value of the TESO is output. Process 302 then ends at step 318. If, however, the determination at step 306 is NO, then the process 302 proceeds to step 308 where the value of $TESO_{(n)}$ is set equal to the value of the sampled TES signal from the most recent nth time interval, $TES_{(n)}$. From step 308, the process 302 continues to step 314, as described above.

In one embodiment of the digital implementation of the invention at step 310, the determination of the kth order derivative values for $TES_{(n)}$ at step 310 may be calculated as set forth in Equation 1 below:

$$\frac{d\, TES_n}{dt} = \frac{TES_{(n)} - TES_{(n-1)}}{T_S},$$

where k is a positive integer and k=1, $T_S$ represents the sampling time interval, and (n−1) represents the sampling time interval immediately preceding the most recent time interval, n. In such case, then at step 312, the approximated value of the TES output signal, $TESO_{(n)}$ may be determined in accordance with Equation 2, below:

$$TESO_{(n)} = TESO_{(n-1)} + \frac{d\, TESO_{(n-1)}}{dt} \cdot T_S$$

In a second embodiment of the digital implementation of the invention, at step 310 higher order derivatives of the TES signal may be determined, as for example, where k is a positive integer and k>1. In such case, such kth order derivatives may be determined in accordance with Equation 3 below:

$$\frac{d^k\, TESO_{(m)}}{dt^k} = \frac{\frac{d^{(k-1)}\, TESO_m}{dt^{(k-1)}} - \frac{d^{(k-1)}\, TESO_{(m-1)}}{dt^{(k-1)}}}{T_S}$$

where it is to be noted that $d^0 TESO_{(m)}/dt^0 = TES_{(m)}$, and where m represents the most recent sampling time interval. Then, at step 312, the value of the approximated TES output signal, $TESO_{(n)}$, at the most recent sampled interval, may be approximated using a Taylor's Series as set forth in Equation 5 below:

$$TESO_{(n)} =$$

$$TESO_{(n-1)} + \frac{d\, TESO_{(n-1)}}{dt} \cdot T_S + \frac{d^2\, TES_{(n-1)}}{d^2 t} \cdot T_S^2 + \ldots \frac{d^k\, TES_{(n-1)}}{d^k t} \cdot T_S^k =$$

$$\sum_{k=0}^{v} \frac{d^k\, TES_{(n-1)}}{d^k t} \cdot T_S^k$$

where k and v are integers such that $k \geq 0$ and $v \geq 0$.

Figure 26:
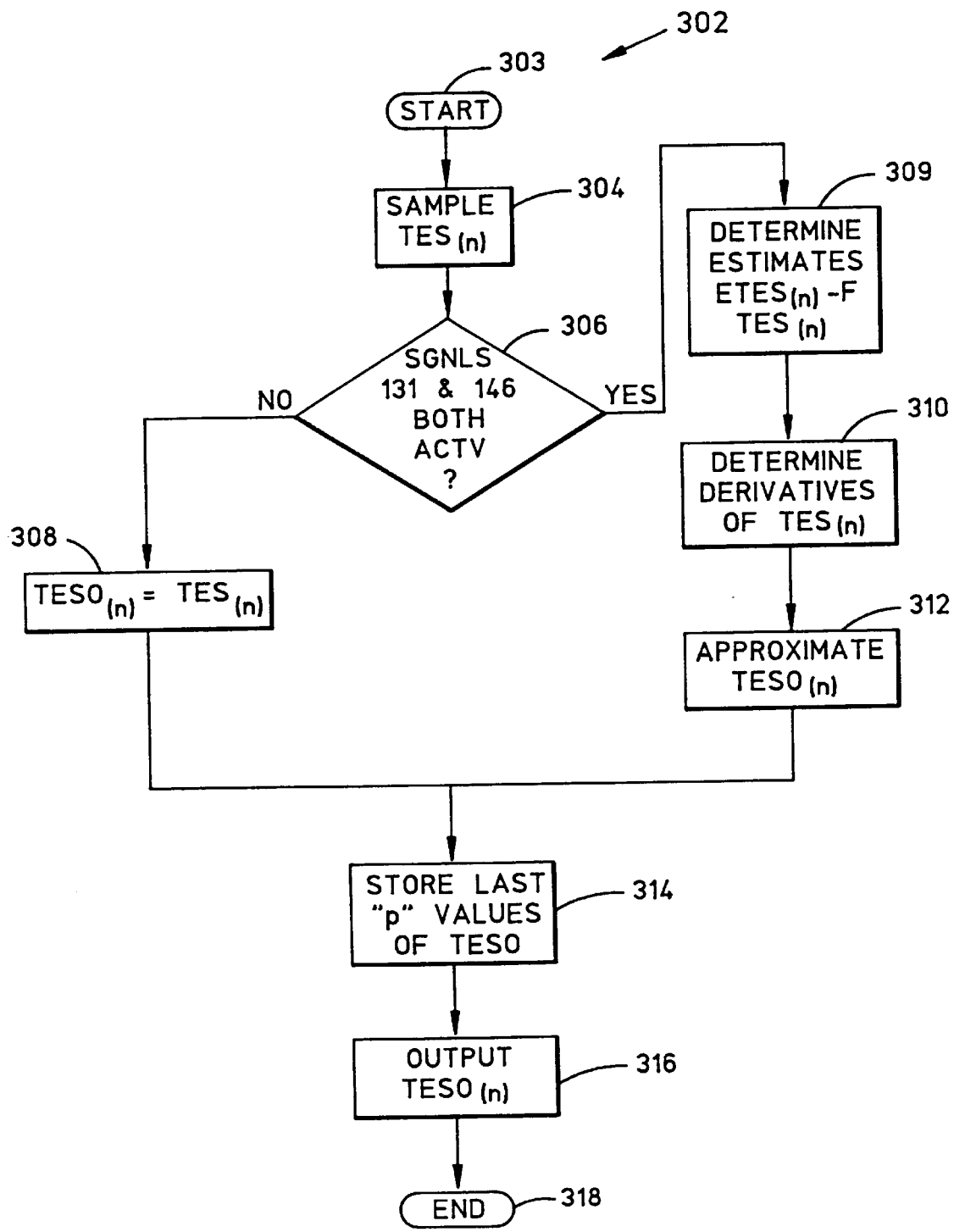
FIG. 26 illustrates an example of a software routine implemented in the computer shown in FIG. 24 which uses a statistical technique to estimate values of the tracking error signal.

Referring to FIG. 26, another implementation of the invention may further include a step 309, immediately preceding step 310, where estimated values of the TES signal, $ETES_{(n)}$ are determined using the well known "least squares" statistical method to more effectively estimate values of the TES signal just prior to detection of a hard sector, i.e., when signal 131 is a logic HIGH. The advantage of using a "least squares" statistical technique at step 309 is to minimize the effect of noise in the sampled TES signals, which sampled TES signed when the derivatives of the sampled TES signals, $TES_{(n)}$, are determined. Because the values of the TES signal are stored at step 304, prior to detection of a hard sector signal 146, it is possible to use a least squares curve fitting technique to fit the $TES_{(n)}$ samples to estimate the best possible values, $ETES_n$, for corresponding values of $TES_{(n)}$. The values of $ETES_n$ may then be used to determine the derivatives, as described with reference to the equations above, but where $ETES_n$ is substituted for $TES_n$.

Obviously, many modifications and variations of the present invention are possible in light of the above teachings. For example, while the invention has been described with reconstructing signal 63A through interpolation, where signal 63A has been idealized as a sine wave, it is to be understood the present invention may be employed to reconstruct any time dependent signal. Further, the invention may be applied in contexts other than optical disk drive systems. Also, one may implement hardware circuitry to approximate the TES signal using higher order derivatives. Therefore, it is to be understood that within the scope of the appended claims, the invention may be practiced otherwise than as specifically described.

We claim:

1. A method for processing tracking error signals in an optical data storage system, comprising:

sampling said tracking error signals at a periodic rate;

determining if first and second signals each have a predetermined logic level; and determining kth order derivatives of said sampled tracking error signals, where k is a positive integer, if said first and second signals each have said predetermined logic level.

2. The method of claim 1, further comprising:

determining tracking error output signals from said kth order derivatives if said first and second signals each have said predetermined logic level.

3. The method of claim 2 wherein determining said tracking error output signals from said kth order derivatives includes determining said tracking error output signals from a Taylor's Series expansion.

4. The method of claim 2, further comprising:

determining estimated values of said tracking error signals using a least squares statistical technique, the estimated values for use in determining said tracking error output signals from said kth order derivatives.

5. The method of any one of claims 2 or 4, further comprising:

determining said tracking error output signals from said sampled tracking error signals if said logic levels of said first and second signals are both not at said predetermined logic level.

6. The method of claim 5, further comprising:

storing a number of said tracking error output signals; and generating an output signal representing the most recent of said tracking error output signals.

7. A system for processing tracking error signals in an optical data storage system, comprising:

a hard sector detection circuit which generates a first output signal in response to receiving a first input signal representing detection of a hard sector on a magneto-optical disk;

a computer for receiving tracking error signals and a second input signal, and for implementing the steps of:
sampling said tracking error signals at a periodic rate;
determining if first and second signals each have a predetermined logic level; and
determining kth order derivatives of said sampled tracking error signals, where k is a positive integer, if said first and second signals each have said predetermined logic level.

8. The system of claim 7, wherein said computer is for implementing the further steps of:

determining tracking error output signals from said kth order derivatives if said first and second signals each have said predetermined logic level.

9. The system of claim 8 wherein determining tracking error output signals from said kth order derivatives includes determining said tracking error output signals from a Taylor's Series expansion.

10. The system of claim 8, wherein said computer is for implementing the further steps of:

determining estimated values of said tracking error signals using a least squares statistical technique, the estimated values for use in determining said tracking error output signals from said kth order derivatives.

11. The system of any one of claims 8 or 10, wherein said computer is for implementing the further steps of:

determining said tracking error output signals from said sampled tracking error signals if said logic levels of said first and second signals are both not at said predetermined logic level.

12. The system of claim 11, wherein said computer is for implementing the further steps of:

storing a number of said tracking error output signals; and generating an output signal representing the most recent of said tracking error output signals.

13. A system for compensating for hard sector noise degradation of tracking error signals in an optical data storage system, comprising:

a hard sector detection circuit which generates a first output signal in response to receiving a first input signal representing detection of a hard sector on a magneto-optical disk; and a computer for receiving tracking error signals and a second input signal, and for implementing the steps of:
1) sampling said tracking error signals at a periodic rate;
2) determining if first and second signals each have a predetermined logic level;
3) determining estimated values of said tracking error signals using a least squares statistical technique;
4) determining kth order derivatives of said estimated values of said tracking error signals if said first and second signals each have said predetermined logic level, where k is a positive integer;
5) determining tracking error output signals from said kth order derivatives if said first and second signals each have said predetermined logic level;
6) determining said tracking error output signals from said sampled tracking error signals if said logic levels of said first and second signals are both not at said predetermined logic level;
7) storing a predetermined number of said tracking error output signals; and
8) generating an output signal representing the most recent of said tracking error output signals.

14. The method of claim 13 wherein said tracking error output signals from said kth order derivatives are determined from a Taylor's Series expansion.

15. A computer program product for use with a digital data processor, for compensating for hard sector noise degradation of tracking error signals in an optical data storage system, comprising:

a storage medium;

a computer program encoded on said storage medium and executable for:
sampling tracking error signals at a periodic rate;
determining if first and second signals each have a predetermined logic level;
determining kth order derivatives of said sampled tracking error signals, where k is a positive integer, if said first and second signals each have said predetermined logic level;
determining tracking error output signals based on said kth order derivatives if said first and second signals each have said predetermined logic level; and determining tracking error output signals based on said sampled tracking error signals if said logic levels of said first and second signals are both not at said predetermined logic level.

16. The computer program product of claim 15, wherein said computer program is further executable for:

determining estimated values of said tracking error signals using a least squares statistical technique, the estimated values for use in determining said tracking error output signals from said kth order derivatives.

17. The computer program product of claim 15, wherein said computer program is further executable for:

storing a number of said tracking error output signals; and generating an output signal representing the most recent of said tracking error output signals.

18. The computer program product of claim 17, wherein said computer program is further executable for determining tracking error output signals from a Taylor's Series expansion when determining tracking error output signals from said kth order derivatives.

* * * * *

UNITED STATES PATENT AND TRADEMARK OFFICE
CERTIFICATE OF CORRECTION

PATENT NO.   : 6,052,345
DATED        : April 18, 2000
INVENTOR(S)  : Bates et al It is certified that error appears in the above-identified patent and that said Letters Patent is hereby corrected as shown below:

Column 12, line 48, Claim 14, change "method" to --system--.

Signed and Sealed this

Fifteenth Day of May, 2001

Attest:

NICHOLAS P. GODICI

*Attesting Officer*    *Acting Director of the United States Patent and Trademark Office*